US009830936B2

(12) United States Patent
Li et al.

(10) Patent No.: US 9,830,936 B2
(45) Date of Patent: Nov. 28, 2017

(54) MAGNETIC READ HEAD WITH ANTIFERROMAGENTIC LAYER

(71) Applicant: Western Digital (Fremont), LLC, Fremont, CA (US)

(72) Inventors: Shaoping Li, San Ramon, CA (US); Yuankai Zheng, Fremont, CA (US); Gerardo A. Bertero, Redwood City, CA (US); Qunwen Leng, Palo Alto, CA (US); Michael L. Mallary, Sterling, MA (US); Rongfu Xiao, Dublin, CA (US); Ming Mao, Dublin, CA (US); Zhihong Zhang, Fremont, CA (US); Anup G. Roy, Fremont, CA (US); Chen Jung Chien, Mountain View, CA (US); Zhitao Diao, Fremont, CA (US); Ling Wang, San Ramon, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 131 days.

(21) Appl. No.: 14/943,211

(22) Filed: Nov. 17, 2015

(65) Prior Publication Data

US 2016/0180870 A1   Jun. 23, 2016

Related U.S. Application Data

(63) Continuation of application No. 14/230,962, filed on Mar. 31, 2014, now Pat. No. 9,214,172.

(60) Provisional application No. 61/894,550, filed on Oct. 23, 2013.

(51) Int. Cl.
    G11B 5/39   (2006.01)
    G11B 5/31   (2006.01)

(52) U.S. Cl.
    CPC .......... *G11B 5/3909* (2013.01); *G11B 5/3163* (2013.01); *G11B 5/398* (2013.01); *G11B 5/3912* (2013.01); *Y10T 428/1114* (2015.01)

(58) Field of Classification Search
    CPC ... G11B 5/3912; G11B 5/3163; G11B 5/3909; G11B 5/398; Y10T 428/1114
    See application file for complete search history.

(56) References Cited

U.S. PATENT DOCUMENTS

| | | |
|---|---|---|
| 5,206,590 A | 4/1993 | Dieny et al. |
| 5,612,098 A | 3/1997 | Tan et al. |
| 5,717,550 A | 2/1998 | Nepela et al. |
| 5,828,530 A | 10/1998 | Gill et al. |
| 5,876,848 A | 3/1999 | Tan et al. |
| 5,898,547 A | 4/1999 | Fontana, Jr. et al. |
| 6,016,290 A | 1/2000 | Chen et al. |
| 6,018,441 A | 1/2000 | Wu et al. |

(Continued)

OTHER PUBLICATIONS

Yimin Guo, et al., U.S. Appl. No. 12/731,108, filed Mar. 24, 2010, 25 pages.

(Continued)

*Primary Examiner* — Brian Miller
(74) *Attorney, Agent, or Firm* — Foley & Lardner LLP

(57) ABSTRACT

A tunnel magnetoresistance (TMR) read sensor having a tabbed AFM layer and an extended pinned layer and methods for making the same are provided. The TMR read sensor has an AFM layer recessed from the air bearing surface, providing a reduced shield-to-shield distance.

4 Claims, 7 Drawing Sheets

(56) References Cited

U.S. PATENT DOCUMENTS

| | | |
|---|---|---|
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,478 B1 | 6/2002 | Mao et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,466,419 B1 | 10/2002 | Mao |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |

(56) References Cited

U.S. PATENT DOCUMENTS

| | | |
|---|---|---|
| 6,597,546 B2 | 7/2003 | Gill |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,631,055 B2 | 10/2003 | Childress et al. |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,667,616 B1 | 12/2003 | Shukh et al. |
| 6,674,610 B1 | 1/2004 | Thomas et al. |
| 6,680,828 B2 | 1/2004 | Gill |
| 6,680,830 B2 | 1/2004 | Gill |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,724,584 B2 | 4/2004 | Mack et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,236 B1 | 5/2004 | Mao et al. |
| 6,738,237 B2 | 5/2004 | Gill |
| 6,741,432 B2 | 5/2004 | Pinarbasi |
| 6,744,607 B2 | 6/2004 | Freitag et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,751,073 B2 | 6/2004 | Hasegawa |
| 6,751,845 B2 | 6/2004 | Gill |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,762,915 B2 * | 7/2004 | Pokhil .................. B82Y 10/00 360/324 |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,798 B2 | 8/2004 | Gill |
| 6,781,927 B1 | 8/2004 | Heanuc et al. |
| 6,785,102 B2 | 8/2004 | Freitag et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,801,412 B2 | 10/2004 | Gill |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,833,982 B2 | 12/2004 | Jayasekara |
| 6,834,010 B1 | 12/2004 | Qi et al. |
| 6,847,510 B2 | 1/2005 | Childress et al. |
| 6,856,493 B2 | 2/2005 | Pinarbasi |
| 6,859,343 B1 | 2/2005 | Alfoqaha et al. |
| 6,859,348 B2 | 2/2005 | Pinarbasi |
| 6,859,997 B1 | 3/2005 | Tong et al. |
| 6,861,937 B1 | 3/2005 | Feng et al. |
| 6,865,062 B2 | 3/2005 | Pinarbasi |
| 6,867,952 B2 | 3/2005 | Hasegawa |
| 6,867,953 B2 | 3/2005 | Gill |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,901,652 B2 | 6/2005 | Hasegawa et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,933,042 B2 | 8/2005 | Gill |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,943,997 B2 | 9/2005 | Gill |
| 6,944,938 B1 | 9/2005 | Crue, Jr. et al. |
| 6,947,258 B1 | 9/2005 | Li |
| 6,947,264 B2 | 9/2005 | Gill |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,983,530 B2 | 1/2006 | Gill |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,016,168 B2 | 3/2006 | Li et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,035,059 B2 | 4/2006 | Gill |
| 7,035,062 B1 | 4/2006 | Mao et al. |
| 7,037,847 B2 | 5/2006 | Le et al. |
| 7,038,889 B1 | 5/2006 | Freitag et al. |
| 7,041,985 B1 | 5/2006 | Wang et al. |
| 7,046,490 B1 | 5/2006 | Ueno et al. |
| 7,050,277 B2 | 5/2006 | Gill et al. |
| 7,054,113 B1 | 5/2006 | Seagle et al. |
| 7,057,857 B1 | 6/2006 | Niu et al. |
| 7,059,868 B1 | 6/2006 | Yan |
| 7,072,154 B2 | 7/2006 | Gill et al. |
| 7,082,017 B2 | 7/2006 | Freitag et al. |
| 7,092,195 B1 | 8/2006 | Liu et al. |
| 7,092,220 B2 | 8/2006 | Gill et al. |
| 7,092,221 B2 | 8/2006 | Gill |
| 7,094,130 B2 | 8/2006 | Cyrille et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |

(56) References Cited

U.S. PATENT DOCUMENTS

| | | |
|---|---|---|
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,151,654 B1 | 12/2006 | Mao et al. |
| 7,154,715 B2 | 12/2006 | Yamanaka et al. |
| 7,161,773 B2 | 1/2007 | Fontana, Jr. et al. |
| 7,170,725 B1 | 1/2007 | Zhou et al. |
| 7,171,741 B2 | 2/2007 | Gill |
| 7,177,117 B1 | 2/2007 | Jiang et al. |
| 7,177,120 B2 | 2/2007 | Freitag et al. |
| 7,193,815 B1 | 3/2007 | Stoev et al. |
| 7,196,878 B2 | 3/2007 | Fox et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,220,499 B2 | 5/2007 | Saito et al. |
| 7,238,292 B1 | 7/2007 | He et al. |
| 7,239,478 B1 | 7/2007 | Sin et al. |
| 7,245,463 B2 | 7/2007 | Gill |
| 7,248,431 B1 | 7/2007 | Liu et al. |
| 7,248,433 B1 | 7/2007 | Stoev et al. |
| 7,248,447 B2 | 7/2007 | Gill |
| 7,248,449 B1 | 7/2007 | Seagle |
| 7,265,946 B2 | 9/2007 | Gill |
| 7,268,980 B2 | 9/2007 | Gill |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,313,856 B2 | 1/2008 | Gill |
| 7,318,947 B1 | 1/2008 | Park et al. |
| 7,324,310 B2 | 1/2008 | Gill |
| 7,330,339 B2 | 2/2008 | Gill |
| 7,333,295 B1 | 2/2008 | Medina et al. |
| 7,337,530 B1 | 3/2008 | Stoev et al. |
| 7,342,752 B1 | 3/2008 | Zhang et al. |
| 7,345,854 B2 | 3/2008 | Takano |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,365,949 B2 | 4/2008 | Hayakawa et al. |
| 7,369,371 B2 | 5/2008 | Freitag et al. |
| 7,370,404 B2 | 5/2008 | Gill et al. |
| 7,371,152 B1 | 5/2008 | Newman |
| 7,372,665 B1 | 5/2008 | Stoev et al. |
| 7,372,674 B2 | 5/2008 | Gill |
| 7,375,926 B1 | 5/2008 | Stoev et al. |
| 7,379,269 B1 | 5/2008 | Krounbi et al. |
| 7,382,589 B2 | 6/2008 | Lin et al. |
| 7,386,933 B1 | 6/2008 | Krounbi et al. |
| 7,389,577 B1 | 6/2008 | Shang et al. |
| 7,405,908 B2 | 7/2008 | Gill |
| 7,405,909 B2 | 7/2008 | Gill |
| 7,417,832 B1 | 8/2008 | Erickson et al. |
| 7,419,610 B2 | 9/2008 | Cyrille et al. |
| 7,419,891 B1 | 9/2008 | Chen et al. |
| 7,420,787 B2 | 9/2008 | Freitag et al. |
| 7,420,788 B2 | 9/2008 | Pinarbasi |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,463,459 B2 | 12/2008 | Ding et al. |
| 7,466,524 B2 | 12/2008 | Freitag et al. |
| 7,469,465 B2 | 12/2008 | Ding et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,522,391 B2 | 4/2009 | Freitag et al. |
| 7,522,392 B2 | 4/2009 | Carey et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,580,230 B2 | 8/2009 | Freitag et al. |
| 7,583,466 B2 | 9/2009 | Kermiche et al. |
| 7,595,967 B1 | 9/2009 | Moon et al. |
| 7,599,155 B2 | 10/2009 | Saito et al. |
| 7,602,589 B2 | 10/2009 | Freitag et al. |
| 7,616,411 B2 | 11/2009 | Gill |
| 7,639,457 B1 | 12/2009 | Chen et al. |
| 7,652,856 B2 | 1/2010 | Pinarbasi |
| 7,660,080 B1 | 2/2010 | Liu et al. |
| 7,663,846 B2 | 2/2010 | Freitag et al. |
| 7,672,080 B1 | 3/2010 | Tang et al. |
| 7,672,086 B1 | 3/2010 | Jiang |
| 7,676,905 B2 | 3/2010 | Pinarbasi |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,697,242 B2 | 4/2010 | Gill |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,800,867 B2 | 9/2010 | Saito et al. |
| 7,819,979 B1 | 10/2010 | Chen et al. |
| 7,829,264 B1 | 11/2010 | Wang et al. |
| 7,835,116 B2 * | 11/2010 | Xue .................. B82Y 25/00 360/324.11 |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,916,435 B1 | 3/2011 | Gill |
| 7,918,013 B1 | 4/2011 | Dunn et al. |
| 7,961,440 B2 | 6/2011 | Gill et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,068,317 B2 | 11/2011 | Gill |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,116,043 B2 | 2/2012 | Leng et al. |

(56) References Cited

U.S. PATENT DOCUMENTS

| | | |
|---|---|---|
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,149,548 B2 | 4/2012 | Hatatani et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,266,785 B2 | 9/2012 | Freitag et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,318,030 B2 | 11/2012 | Peng et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,333,898 B2 | 12/2012 | Brown et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,400,738 B2 | 3/2013 | Covington et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,520,344 B2 * | 8/2013 | Xue ............... B82Y 25/00 360/324.11 |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,553,369 B2 * | 10/2013 | Song ............... B82Y 10/00 360/324.12 |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |

(56) References Cited

U.S. PATENT DOCUMENTS

| | | | |
|---|---|---|---|
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,249 B2 * | 11/2013 | Sapozhnikov | G01R 33/093 360/324.11 |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,054 B1 | 12/2013 | Shang et al. | |
| 8,611,055 B1 | 12/2013 | Pakala et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 | 3/2014 | Shi et al. | |
| 8,670,295 B1 | 3/2014 | Hu et al. | |
| 8,675,318 B1 * | 3/2014 | Ho | G11B 5/3912 360/324.11 |
| 8,675,455 B1 | 3/2014 | Krichevsky et al. | |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,711,518 B1 | 4/2014 | Zeng et al. | |
| 8,711,528 B1 * | 4/2014 | Xiao | G11B 5/3909 360/122 |
| 8,717,709 B1 | 5/2014 | Shi et al. | |
| 8,720,044 B1 | 5/2014 | Tran et al. | |
| 8,721,902 B1 | 5/2014 | Wang et al. | |
| 8,724,259 B1 | 5/2014 | Liu et al. | |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |
| 8,786,983 B1 | 7/2014 | Liu et al. | |
| 8,790,524 B1 | 7/2014 | Luo et al. | |
| 8,790,527 B1 | 7/2014 | Luo et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 9,042,059 B1 * | 5/2015 | Katine | G11B 5/3909 360/316 |
| 9,214,172 B2 * | 12/2015 | Li | G11B 5/3912 |
| 9,401,163 B2 * | 7/2016 | McKinlay | G11B 5/115 |
| 2002/0131219 A1 | 9/2002 | Mack et al. | |
| 2003/0123198 A1 | 7/2003 | Sugawara et al. | |
| 2003/0179520 A1 | 9/2003 | Hasegawa | |
| 2004/0061983 A1 | 4/2004 | Childress et al. | |
| 2004/0166368 A1 | 8/2004 | Gill et al. | |
| 2006/0023375 A1 | 2/2006 | Gill | |
| 2006/0092582 A1 | 5/2006 | Gill et al. | |
| 2006/0230601 A1 | 10/2006 | Gill et al. | |
| 2006/0232893 A1 | 10/2006 | Gill et al. | |
| 2006/0285259 A1 | 12/2006 | Gill et al. | |
| 2008/0180863 A1 | 7/2008 | Gill | |
| 2009/0086385 A1 | 4/2009 | Gill et al. | |
| 2009/0286106 A1 | 11/2009 | Gill et al. | |
| 2009/0316308 A1 | 12/2009 | Saito et al. | |
| 2010/0232072 A1 | 9/2010 | Dimitrov et al. | |
| 2010/0290157 A1 | 11/2010 | Zhang et al. | |
| 2011/0086240 A1 | 4/2011 | Xiang et al. | |
| 2011/0228428 A1 | 9/2011 | Dimitrov et al. | |
| 2012/0111826 A1 | 5/2012 | Chen et al. | |
| 2012/0134057 A1 * | 5/2012 | Song | B82Y 10/00 360/319 |
| 2012/0216378 A1 | 8/2012 | Emley et al. | |
| 2012/0237878 A1 | 9/2012 | Zeng et al. | |
| 2012/0276415 A1 * | 11/2012 | Sapozhnikov | G01R 33/093 428/831 |
| 2012/0298621 A1 | 11/2012 | Gao | |
| 2013/0082696 A1 | 4/2013 | Le et al. | |
| 2013/0092654 A1 | 4/2013 | Balamane et al. | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0154529 A1 | 6/2014 | Yang et al. | |
| 2014/0175050 A1 | 6/2014 | Zhang et al. | |

OTHER PUBLICATIONS

Notice of Allowance dated Aug. 24, 2015 from U.S. Appl. No. 14/230,962, 8 pages.

Office Action dated Apr. 17, 2015 from U.S. Appl. No. 14/230,962, 7 pages.

* cited by examiner

MAGNETIC READ HEAD WITH ANTIFERROMAGENTIC LAYER

CROSS-REFERENCE TO RELATED APPLICATIONS

This application is a continuation divisional of U.S. application Ser. No. 14/230,962, filed Mar. 31, 2014, which in turn claims priority to U.S. Provisional Application No. 61/894,550, filed Oct. 23, 2013, which are incorporated herein by reference in their entireties.

BACKGROUND

In magnetic storage devices such as hard disk drives (HDD), read and write heads are used to magnetically read and write information to and from storage media. In a HDD, data may be stored on one or more disks in a series of adjacent concentric circles which may be referred to as data tracks. A HDD may include a rotary actuator, a suspension mounted on an arm of the rotary actuator, and a slider bonded to the suspension to form a head gimbal assembly (HGA). In a traditional HDD, the slider carries a write head and read head, and radially slides over the surface of the storage media, e.g., a disk, under the control of a servo control system that selectively positions a head over a specific track of the disk. In this one read head (reader) configuration, the reader is aligned over the center of a track for data read back.

As HDD storage capacities have increased, the data track separation has decreased and the density has increased. Increasing magnetic recording density entails narrower-track widths and narrower shield-to-shield (S-S) spacing on the read heads. Current tunnel magnetoresistance (TMR) read heads can include among other elements, a pinned layer coupled to an antiferromagnet (AFM) layer. The TMR read heads may further comprise a free layer separated from the pinned layer by a barrier layer. In current perpendicular magnetic recording (PMR) read heads, little room exists, if any, to further reduce S-S spacing due to the existence of the AFM pinning material underneath the pinned layer. Attempts to narrow the S-S spacing by removing the AFM layer have been unsuccessful because AFM-free TMR read heads are prevalently magnetically bi-directional.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Figure 1:
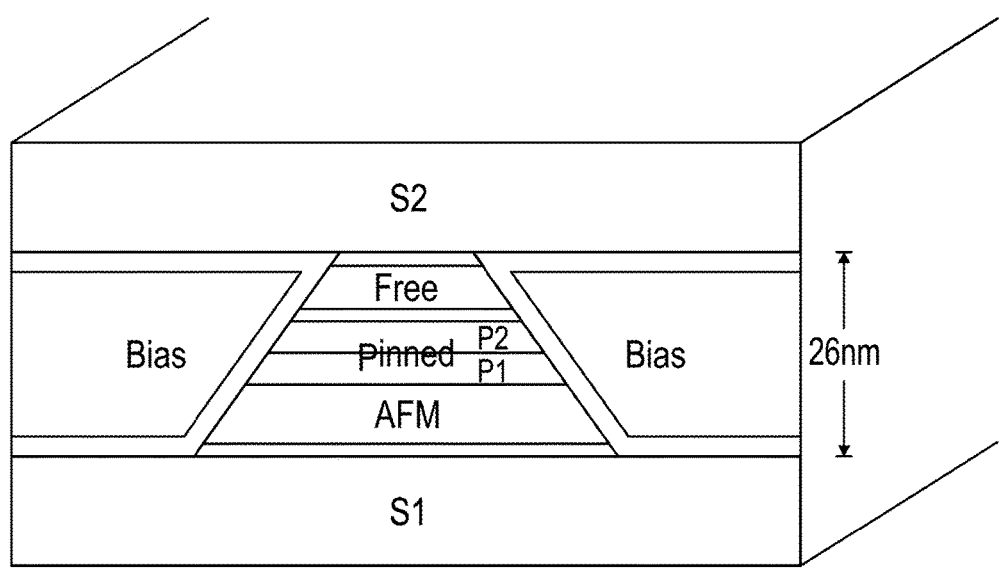
FIG. 1 illustrates a conventional read sensor.

In a conventional TMR read sensor, such as TMR read sensor 100 illustrated in an air bearing surface (ABS) perspective view of FIG. 1, a first shield layer, S1, may be disposed over a substrate. First shield layer S1 may comprise a Nickel Iron (NiFe) alloy, also referred to as permalloy, or another magnetic shield material for TMR read sensors. In some cases, first shield layer S1 may be composed of a single shield material. In other cases, first shield layer S1 may have a composite structure. For example, first shield layer S1 may comprise one or more layers of NiFe, NiFe multilayers, Cobalt Iron (CoFe), or Ruthenium (Ru).

Atop first shield layer S1, a seed layer may be disposed, as well as an AFM layer. The seed layer may comprise Tantalum (Ta), Ru, a Ta/Ru bilayer or other conventional seed layer(s). The AFM layer may comprise various antiferromagnetic materials, such as IrMn, Platinum Manganese (PtMn), Palladium Manganese (PdMn), Nickel Manganese (NiMn), Rhodium Manganese (RhMn), or RhRuMn. IrMn is often used in TMR AFM layers because it provides a thinner AFM layer than other materials.

Additionally, an AFM pinned layer may be disposed on the seed layer. The AFM pinned layer is magnetically pinned by the AFM layer in a particular direction, and may comprise a first pinned layer P1 of CoFe that provides a material transition between the AFM layer and a second pinned layer P2. In other cases, the pinned layer may comprise a tri-layer of a first layer of a soft magnetic material such as CoFe, a second layer of Ru, Cr, Ag, or Au, or other suitable non-magnetic material, and a third layer of soft magnetic material, such as CoFe.

Figure 2:
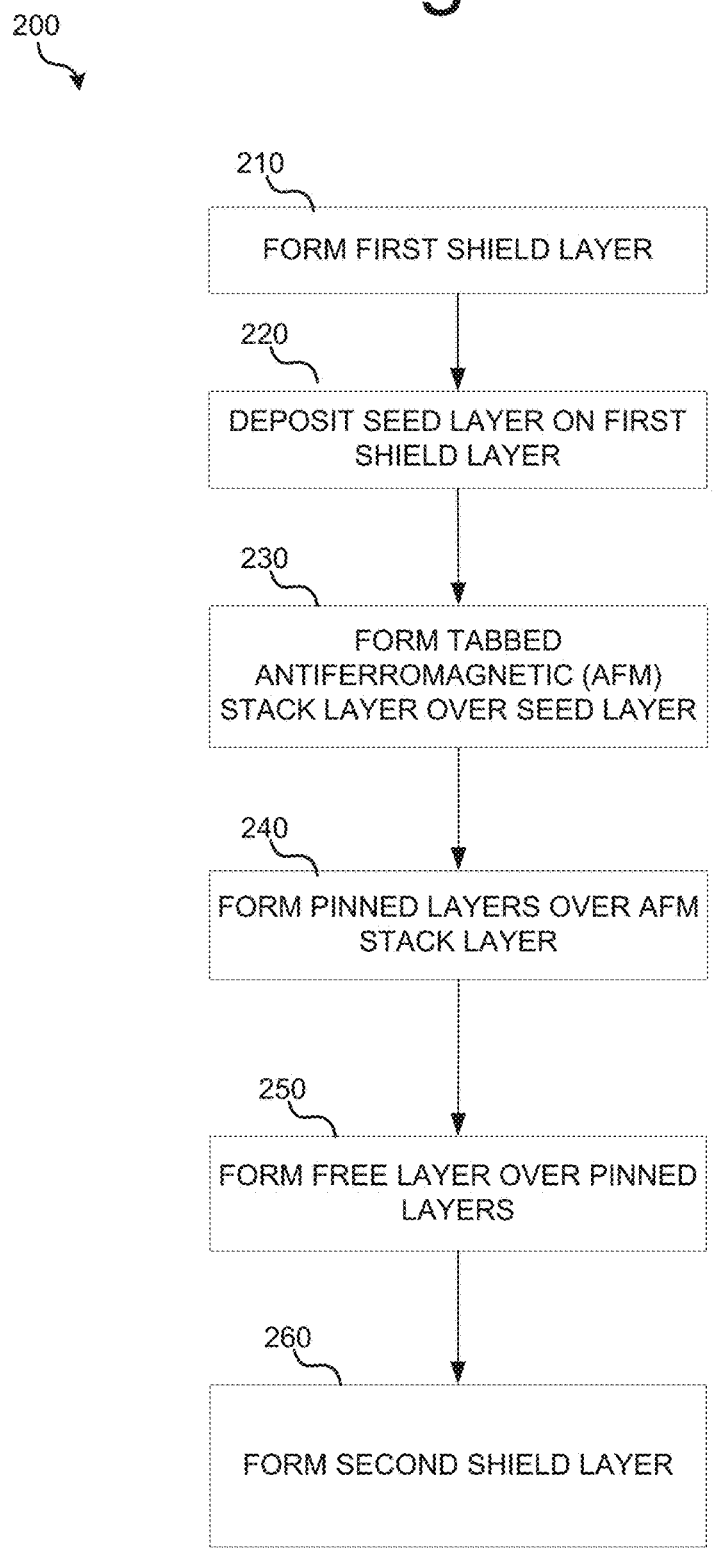
FIG. 2 is an operational flow chart illustrating example processes performed in accordance with various embodiments for manufacturing a TMR read sensor.

TMR read sensor 100 further comprises a free layer separated from the pinned layer by a barrier layer and separated from a second (top) shield layer, S2, by a capping layer. The free layer comprises a ferromagnetic material, such as NiFe, CoFe, or CoNiFe. The barrier layer comprises an insulating material, and may be selected to provide a seed layer for the free layer. For example, Magnesium Oxide (MgO) may be used as the barrier layer. The capping layer isolates the free layer from the top shield layer and comprises a non-magnetic material, such as Ru, Ta, or a bilayer thereof. Top shield S2 is disposed over the TMR read sensor layers, and may also comprise NiFe or other conventional material for TMR read sensors. For example, top shield S2 may have a composition similar to the first shield S1. Further still, TMR read sensor 100 may include antiferromagnetic-coupled soft bias (AFC SB) structures for magnetically biasing the free layer. As illustrated in FIG. 2, the S-S is the distance between the first shield S1 and the second shield S2 at the ABS, which in this conventional example is approximately 25-26 nm.

In accordance with various embodiments, a read head architecture and fabrication method to enable ultra-thin S-S spacing is provided. In various embodiments, the AFM pinning layer, which may include Iridium Manganese (IrMn), may be removed from the bottom of a pinned layer of the TMR film stack, hence reducing the two shield separation, while tabbing the AFM pinning layer to either side of the remaining TMR film stack but underneath the "extended" pinned layer. A read head manufactured to have such an architecture in accordance with various embodiments may retain stronger AFM pinning strength and may be easier to fabricate, where such embodiments may be provided for 1 $Tb/in^2$ ultra high density magnetic recording heads at sub-20 nm thin S-S spacing.

FIG. 2 is an operational flow chart illustrating an example method 200 that can be performed to manufacture a TMR read sensor having an ultra-thin S-S spacing in accordance with various embodiments. Method 200 may begin with operation 210, wherein a first shield layer is formed. The first shield layer may have a single shield material structure or a composite structure. The first shield layer may comprise one or more layers of NiFe, NiFe multilayers, CoFe, or Ru. At operation 220, a seed layer is deposited on the first shield layer. The seed layer may comprise Ta, Ru, a Ta/Ru bilayer or other conventional seed layer(s). At operation 230, a tabbed AFM stack layer is formed over the seed layer. The tabbed AFM stack layer may comprise various antiferromagnetic materials, such as IrMn, PtMn, PdMn, NiMn, RhMn, or RhRuMn. At operation 240, pinned layers are formed over the AFM stack layer. The pinned layers may have, e.g., a tri-layer structure where first and second pinned layers may be CoFe with a non-magnetic material such as Ru, Cr, Ag, or Au, or other suitable non-magnetic material, separating the first and second pinned layers. At operation 250, a free layer is formed over the pinned layers. The free layer may comprise a non-magnetic material, such as Ru, Ta, or a bilayer thereof. At operation 260, a second shield layer is formed. The second shield layer may have a single shield material structure or a composite structure. The second shield layer may comprise one or more layers of NiFe, NiFe multilayers, CoFe, or Ru.

In accordance with various embodiments, an AFM layer may be positioned on either side of the read track, which is recessed into the first shield layer and serves as a bottom tab to the pinned layer. As will be described below, in some embodiments, the AFM layer may be substantially U-shaped or horseshoe-shaped. However, in other embodiments, the AFM layer may take on other shapes/configurations, e.g., a semi-circular shape, so long as the desired ultra-thin S-S spacing can be maintained. The AFM tab may be formed using a mask similar to that of a hard bias mask but with a center track that is wider than the reader TW. Such an architecture may yield much thinner S-S spacing that conventional structures. In one embodiment, the S-S spacing is approximately 7 nm thinner while the pinned layer is still magnetically pinned by the AFM pinning layer beneath the pinned layer on both sides.

Figure 3A:
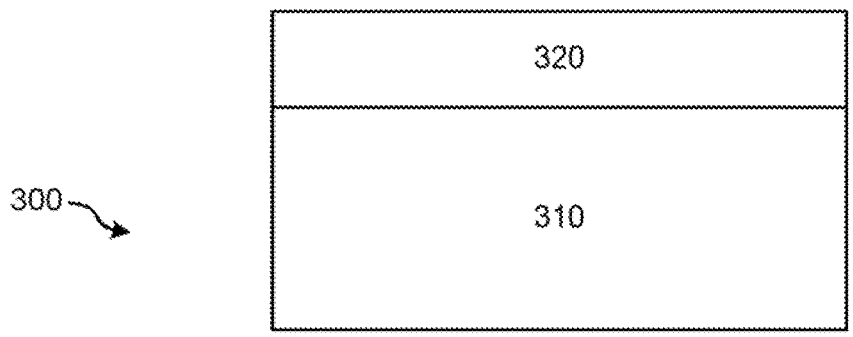
FIGS. 3A-3D illustrate various fabrication stages of a TMR read sensor in accordance with various embodiments.
Figure 3B:
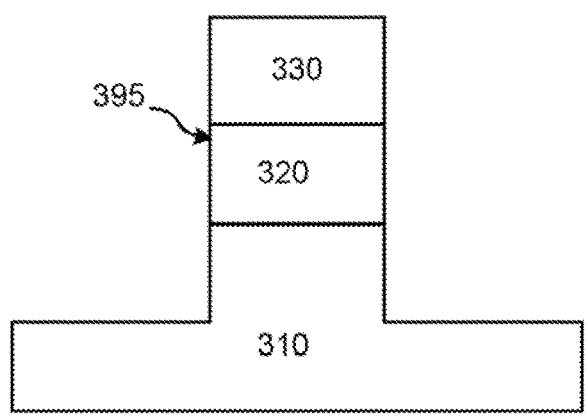
Figure 3C:
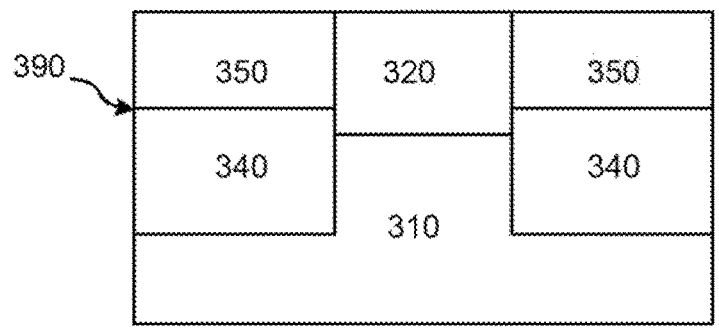
Figure 3D:
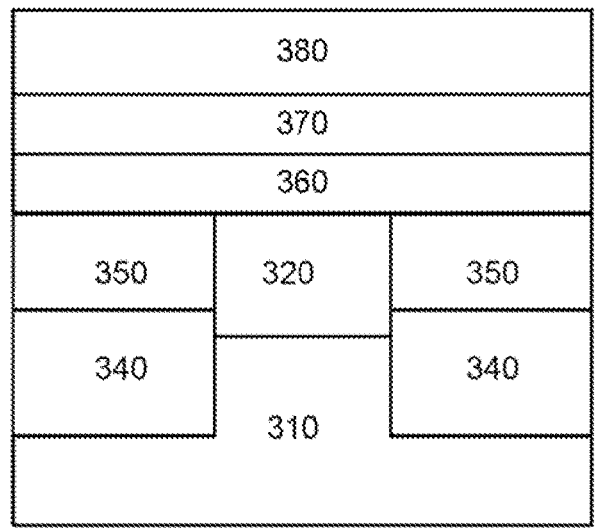

FIGS. 3A-3D illustrates various fabrication stages in accordance with one embodiment, FIG. 3A illustrates a fabrication stage wherein the seed layer 320 is deposited on the first shield layer 310, seed layer 320 comprising CoFeB10 Å/NiFe50 Å/Ta10 Å/Ru60 Å. A photolithography process may be used to define the AFM tab area with a mask similar to a hard bias mask but with a wider center track so as to leave sufficient amount of the first shield layer 310 to retain its shielding properties. Ion milling may then be applied to remove the exposed seed layer 320 to generate a recess as illustrated in FIG. 3B, followed by AFM stack deposition of Ta10 Å/Ru60 Å/IrMn80 Å/CoFe100 Å by either in situ ion beam deposition or ex situ physical vapor deposition (PVD) as illustrated in FIG. 3C, where AFM layer 340 (IrMn) and soft magnetic stitching layer 350 (CoFe) are shown. That is, the AFM layer (i.e., AFM tabbed areas or tabbed AFM stack layer 390) may be placed on either side of a read track 395, which can serve as a bottom tab to the pinned layer, where the AFM tab has a center track that is wider than the reader track width. In situ ion beam deposition can refer to AFM film stack (also referred to as the tabbed AFM stack layer 390) deposition immediately after milling of the TMR seed layer without breaking vacuum. Ex situ PVD can refer to performing TMR seed layer milling and AFM film stack deposition in separate runs/stages with air exposure between the stages. After photoresist 330 liftoff, glazing angle milling may be used for surface planarization to create a flat and smooth surface for the AFM-free TMR stack deposition. The deposition may be carried out in a sputtering chamber and the TMR stack, P1/Ru/P2 (360) MgO/FL (370)/Cap (380), may be seamlessly stitched onto the formed AFM bottom tab as illustrated in FIG. 3D. A relatively flat and smooth interface between the AFM tab and TMR stack results from the above process, and a standard reader process can be followed, such as, magnetic annealing, reader junction formation, SB depositions, etc. It should be noted that strong AFM pinning between the AFM tab and the pinned layer results, as well as strong antiferromagnetic coupling (AFC) between the P1 and P2 layers of the pinned layer. It should also be noted that the reader junction forms via ion beam partial milling to generated the extended pinned layer along the ABS direction, which is pinned by the underlying AFM tab from both sides.

Figure 4A:
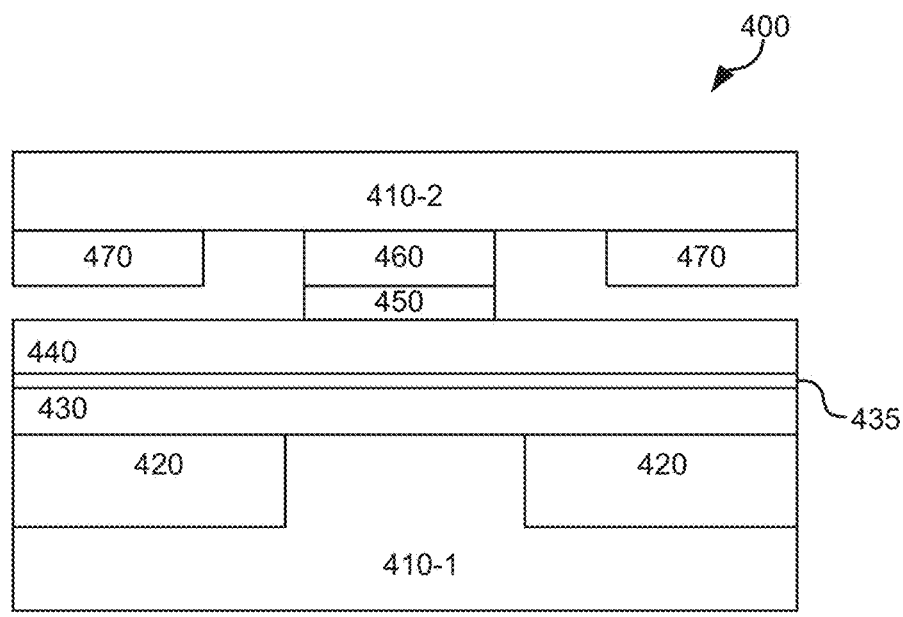
FIGS. 4A and 4B illustrate an example TMR read sensor in accordance with one embodiment.
Figure 4B:
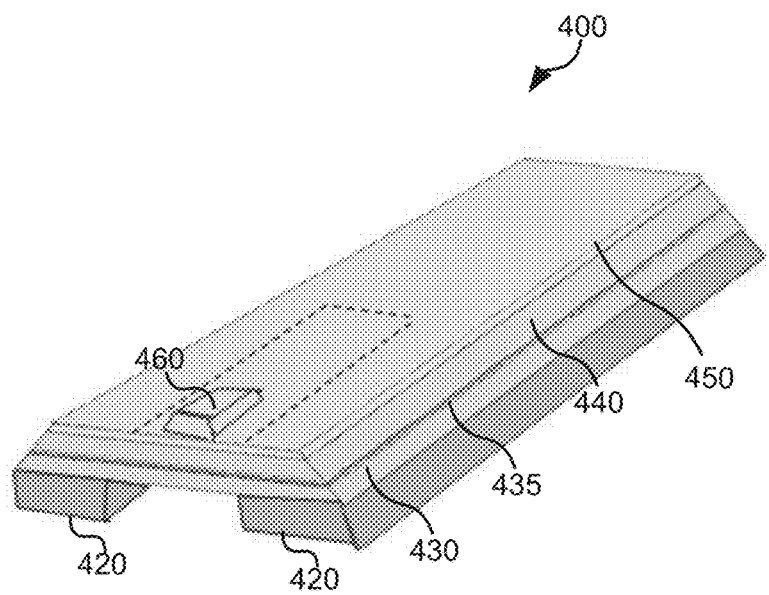

FIGS. 4A-4B illustrate an example TMR read sensors manufactured to have an architecture enabling ultra-thin S-S spacing in accordance with various embodiments. FIGS. 4A and 4B illustrate a TMR read sensor 400, where the AFM pinning layer 420 is substantially U-shaped or horseshoe-shaped. In one embodiment the AFM pinning layer 420 is IrMn, and may be disposed over shield 410-1. Over AFM pinning layer 420, a pinned layer can be deposited. In this example, the pinned layer includes first and second pinned layers 430 and 440, respectively, along with a non-magnetic material 435 resulting in, e.g., a tri-layer structure. A barrier layer 450 may be disposed over the pinned layer, and barrier layer 450 may be, e.g., MgO. TMR read sensor 400 may also include free layer 460 and shield 410-2, as well as AFC SB structure 470. As can be appreciated, the S-S spacing between shields 410-1 and 410-2 may be reduced as a result of AFM pinning layer 420 having a U-shape.

Figure 5A:
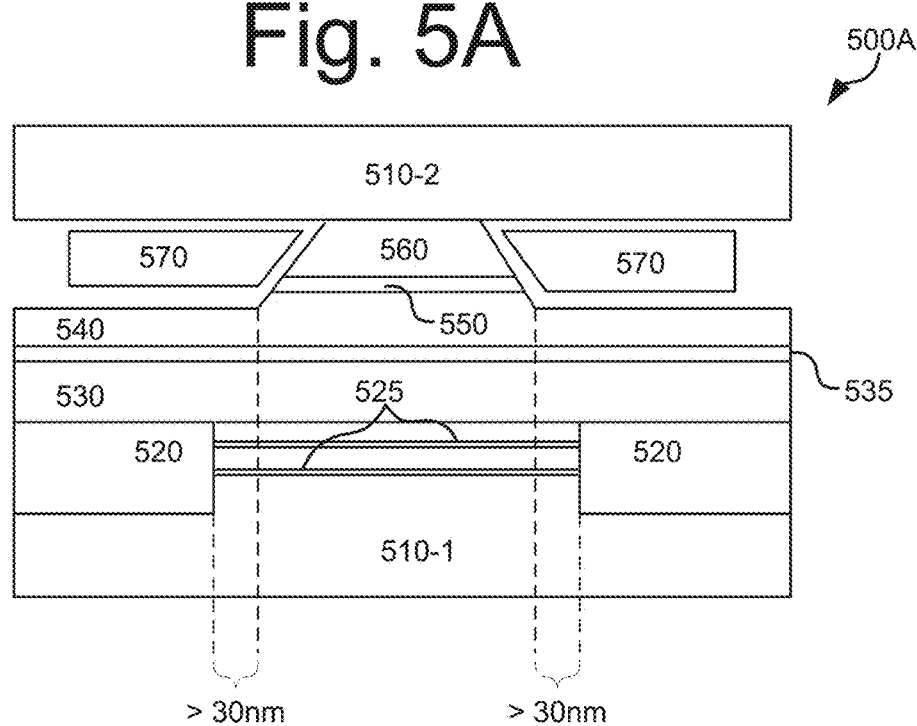
FIGS. 5A-5C illustrate additional example TMR read sensors in accordance with various embodiments.
Figure 5B:
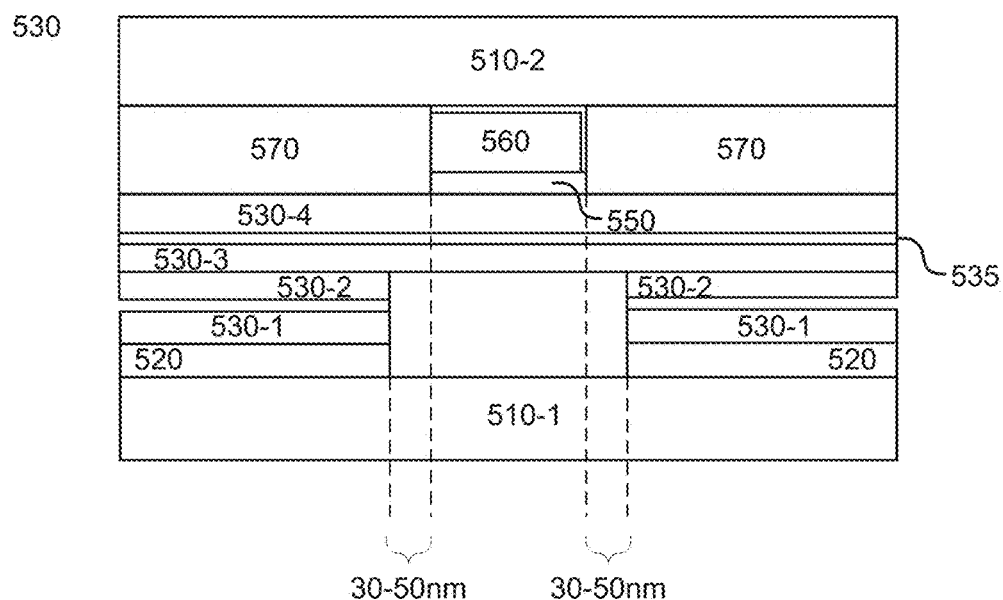
Figure 5C:
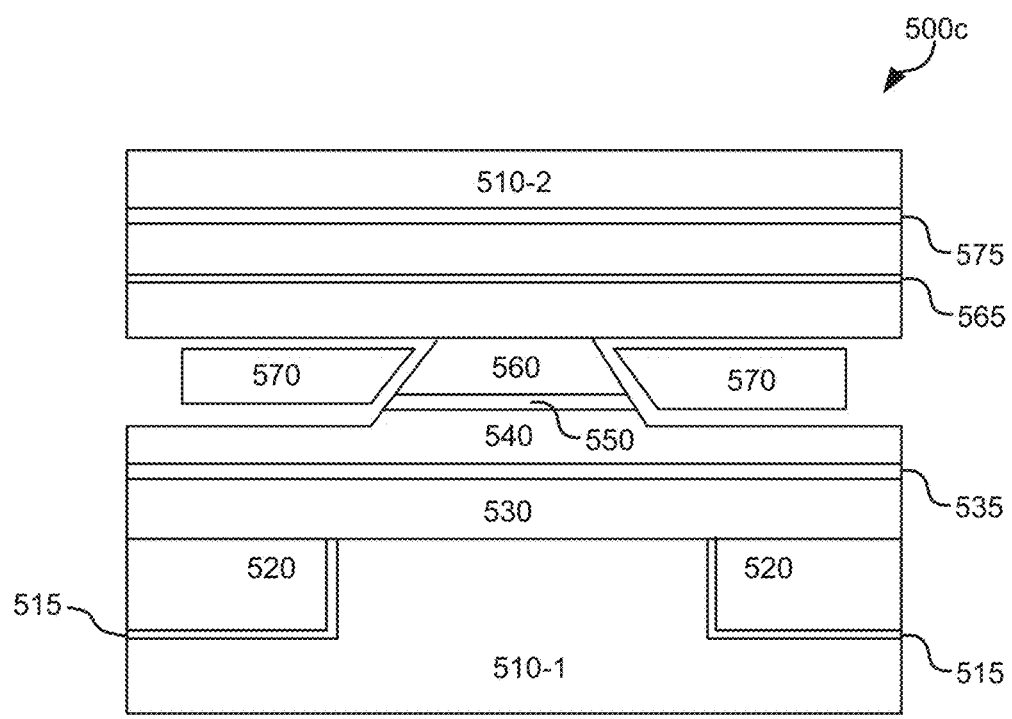

FIGS. 5A-5C illustrate still other example TMR read sensor structures manufactured in accordance with various embodiments to have an ultra-thin S-S spacing. FIG. 5A illustrates a TMR read sensor 500a having a first shield layer 510-1 and a substantially U-shaped AFM pinning layer 520, AFM pinning layer 520 being IrMn. Disposed over AFM pinning layer 520 is a pinned layer, having a tri-layer structure (e.g., P1 530/Ru 535/P2 540). However, a center portion of the P1 530 layer may have a substantially trapezoidal-like ABS perspective cross-section (center read track) upon which a barrier layer 550 and free layer 560 (each of which also have a substantially trapezoidal-like ABS perspective cross-section may be deposited. TMR read sensor 500a further includes AFC SB structure 570 and second shield layer 510-2. It should be noted that there is a distance of at least 30 nm between the respective edges of the U-shaped AFM layer 520 and the center portion of the TMR stack. In accordance with one embodiment, first shield layer 510-1 of TMR read sensor 500a may include a plurality of thin non-magnetic layers 525 (two in this example). Thin non-magnetic layers 525 can be Ru, Cr, or other non-magnetic material, each having a thickness of between, e.g., 5 Å to 20 Å. At high frequencies, the first shield layer 510-1 (e.g., of permalloy/NiFe) permeability may not be optimal. Accordingly, non-magnetic layers 525 can be used to laminate first shield layer 510-1, which results in much higher permeability, leading to better shielding characteristics/effectiveness.

FIG. 5B illustrates a TMR read sensor 500b having a first shield layer 510-1 and a second shield layer 510-2. Deposited on the first shield layer 510-1 is the AFM layer 520. Disposed over the AFM layer 520 is a substantially U-shaped first pinned layer including pinned layers 530-1 and 530-2. Deposited over the first pinned layer is a second pinned layer including pinned layers 530-3 and 530-4 separated by, e.g., a Ru layer 535. Deposited on the second pinned layer can be a barrier layer 550 of MgO and a free layer 560. Similar to FIG. 5A, AFC SB structure 570 may be disposed on the second pinned layer over which second shield layer 510-2 is disposed. The distance between the edge of free layer 560 and AFM layer 520 can be 30-50 nm.

It should be noted that only a few junction fabrication process and stack arrangement differences between the TMR read sensor 500a of FIG. 5A and the TMR read sensor 500b of FIG. 5B. The three-dimensional AFM (IrMn) layer shapes are the same, however, and in both cases, the cross track distance between the outer edge of the free layer and the edge of the FM layer is approximately 100 nm.

FIG. 5C illustrates yet another TMR read sensor 500c manufacture in accordance with various embodiments having a first shield layer 510-1 on which a seed layer 515 is disposed. A substantially U-shaped AFM pinning layer 520, AFM pinning layer 520 being IrMn, may be disposed over the seed layer 515 and first shield layer 510-1. Disposed over AFM pinning layer 520 is a pinned layer, having a tri-layer structure (e.g., P1 530/Ru 535/P2 540). However, a center portion of the P1 530 layer may have a substantially trapezoidal-like ABS perspective cross-section upon which a barrier layer 550 and free layer 560 (each of which also have a substantially trapezoidal-like ABS perspective cross-section may be deposited. TMR read sensor 500a further includes AFC SB structure 570, and a second shield layer 510-2 that includes another AFM layer 575. Similar to TMR read sensor 500a, second shield layer 510-2 may further include a thin non-magnetic layer 565, such as Ru, Cr, etc., which can have a thickness between, e.g., 3.5 Å to 9 Å.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A magnetic read head, comprising:
   a first shield layer;
   a seed layer deposited on the first shield layer;
   a tabbed antiferromagnetic (AFM) stack layer formed over the seed layer, wherein the tabbed AFM stack layer is recessed along both sides of a read track of the magnetic read head;
   first and second pinned layers formed over the tabbed AFM stack layer;
   a free layer formed over the first pinned layer; and
   a second shield layer formed over the first pinned layer.

2. The magnetic read head of claim 1, wherein the tabbed AFM stack layer comprises:
   an AFM layer; and
   a soft magnetic stitching layer.

3. A hard disk drive, comprising:
   at least one rotatable disk having a disk surface;
   a disk drive base;
   a spindle motor attached to the disk drive base and configured to support the at least one rotatable disk for rotating the at least one rotatable disk with respect to the disk drive base; and
   a magnetic reader configured to read data on the disk surface, the magnetic reader comprising:
   a first shield layer; and a seed layer deposited on the first shield layer;
a tabbed antiferromagnetic (AFM) stack layer formed over the seed layer, wherein the tabbed AFM stack layer is recessed along both sides of a read track of the magnetic reader;
first and second pinned layers deposited over the tabbed AFM stack layer;
a free layer deposited over the first pinned layer; and
a second shield layer deposited over the first pinned layer.

4. The hard disk drive of claim 3, wherein the magnetic reader comprises a tunneling magnetoresistance (TMR) reader.

* * * * *